(12) United States Patent
Jiang et al.

(10) Patent No.: US 10,831,057 B2
(45) Date of Patent: Nov. 10, 2020

(54) COLOR FILTER SUBSTRATE, DISPLAY PANEL AND MANUFACTURING METHOD THEREOF, AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Peng Jiang, Beijing (CN); Liangliang Jiang, Beijing (CN); Weihua Jia, Beijing (CN); Haipeng Yang, Beijing (CN); Jaikwang Kim, Beijing (CN); Yongjun Yoon, Beijing (CN)

(73) Assignees: BOE Technology Group Co., Ltd., Beijing (CN); Hefei Xinsheng Optoelectronics Technology Co., Ltd., Hefei (CN)

( * ) Notice: Subject to any disclaimer, the term of this patent is extended or adjusted under 35 U.S.C. 154(b) by 193 days.

(21) Appl. No.: 15/510,016

(22) PCT Filed: Jul. 15, 2016

(86) PCT No.: PCT/CN2016/090133
§ 371 (c)(1),
(2) Date: Mar. 9, 2017

(87) PCT Pub. No.: WO2017/067248
PCT Pub. Date: Apr. 27, 2017

(65) Prior Publication Data
US 2017/0336673 A1   Nov. 23, 2017

(30) Foreign Application Priority Data

Oct. 22, 2015 (CN) .......................... 2015 1 0695038

(51) Int. Cl.
*G02F 1/1335* (2006.01)
*G02F 1/1362* (2006.01)
*G02F 1/13363* (2006.01)

(52) U.S. Cl.
CPC .. *G02F 1/133516* (2013.01); *G02F 1/133512* (2013.01); *G02F 1/133514* (2013.01);
(Continued)

(58) Field of Classification Search
CPC ........ G02F 1/133516; G02F 1/133512; G02F 1/133528; G02F 1/136286; G02F 2201/52;
(Continued)

(56) References Cited

U.S. PATENT DOCUMENTS 5,499,126 A * 3/1996 Abileah ............ G02F 1/133514
349/106
6,016,178 A * 1/2000 Kataoka .............. G02F 1/13363
349/106
(Continued)

FOREIGN PATENT DOCUMENTS

CN      102629022 A    8/2012
CN      103926742 A    7/2014
(Continued)

OTHER PUBLICATIONS

International Search Report and Written Opinion dated Oct. 18, 2016; PCT/CN2016/090133.
(Continued)

*Primary Examiner* — Hoan C Nguyen

(57) ABSTRACT

A color filter substrate, a display panel and a display device are disclosed. The color filter substrate includes a base substrate, and a color filter layer and a phase inversion pattern which are disposed on the base substrate, wherein the phase inversion pattern includes a plurality of openings
(Continued)

corresponding to a plurality of color filter units of the color filter layer, and the phase inversion pattern defines a boundary of each of the color filter units; a projection of the phase inversion pattern on the base substrate at least partially covers a projection of an area between adjacent color filter units on the base substrate; the phase inversion pattern is configured to allow light passing through the phase inversion pattern to undergo phase inversion.

15 Claims, 8 Drawing Sheets

(52) U.S. Cl.
CPC .. *G02F 1/133528* (2013.01); *G02F 1/136286* (2013.01); *G02F 2001/133638* (2013.01); *G02F 2201/52* (2013.01); *G02F 2201/56* (2013.01)

(58) Field of Classification Search
CPC ........... G02F 2201/56; G02F 1/133514; G02F 2001/133638
See application file for complete search history.

(56) References Cited

U.S. PATENT DOCUMENTS

| | | | |
|---|---|---|---|
| 6,724,425 B1* | 4/2004 | Moon | H01L 27/14621 257/E27.151 |
| 7,573,553 B2* | 8/2009 | Itou | G02F 1/13363 349/104 |
| 2007/0077502 A1* | 4/2007 | Moriya | G02F 1/133514 430/7 |
| 2008/0204392 A1* | 8/2008 | Han | G09G 3/3614 345/92 |
| 2009/0015768 A1* | 1/2009 | Igeta | G02F 1/133514 349/106 |
| 2009/0219472 A1* | 9/2009 | Fujita | G02B 5/3016 349/114 |
| 2014/0002776 A1* | 1/2014 | Kim | G02B 5/3083 349/106 |
| 2015/0185546 A1* | 7/2015 | Lee | G02F 1/13363 349/33 |
| 2015/0293438 A1* | 10/2015 | Lee | G03F 1/26 430/5 |
| 2016/0291359 A1 | 10/2016 | Jin et al. | |
| 2016/0320652 A1 | 11/2016 | Chen et al. | |
| 2017/0176800 A1 | 6/2017 | Chen et al. | |

FOREIGN PATENT DOCUMENTS

| | | |
|---|---|---|
| CN | 104090414 A | 10/2014 |
| CN | 104765216 A | 7/2015 |
| CN | 104849925 A | 8/2015 |
| CN | 105137650 A | 12/2015 |
| JP | 03191327 A * | 8/1991 |
| JP | 2007-279688 A | 10/2007 |

OTHER PUBLICATIONS

The First Chinese Office Action dated Aug. 29, 2017; Appln. 201510695038.X.

* cited by examiner

φ=180°

COLOR FILTER SUBSTRATE, DISPLAY PANEL AND MANUFACTURING METHOD THEREOF, AND DISPLAY DEVICE

TECHNICAL FIELD

At least one embodiment of the present disclosure relates to a color filter substrate, a display panel and a manufacturing method thereof, and a display device.

BACKGROUND

With the development of display technology, liquid crystal display panels are widely used in a variety of display devices, such as: mobile phones, watches, computers, tablet PCs, televisions and so on. The basic structure of the liquid crystal display panel includes an array substrate and a color filter substrate, and a liquid crystal layer sandwiched between the two substrates. In the liquid crystal display panel, the black matrix (BM) is a very important component, and configured to shield light as its basic function and avoid light leakage and color mixing between sub-pixels, so as to improve contrast ratio and reduce light reflection of an external light.

On the other hand, with the demand of higher and higher display effect, curved liquid crystal display panels are proposed. However, the biggest problem in the preparation of a curved liquid crystal display panel is that offset occurs when the color filter substrate and the array substrate are bending, which causes the black matrix fails to shield the transmitted light completely, resulting in degradation of the picture quality. In order to overcome this problem, the conventional approach is to widen the black matrix, but this design tends to greatly reduce the transmittance, and needs to increase the backlight to achieve the brightness required by the product, and resulting in greatly increase of product costs and power consumption.

SUMMARY

At least one embodiment of the disclosure provides a color filter substrate, a display panel and a display device. A phase inversion pattern provided on a base substrate of the color filter substrate can replace or partially replace the black matrix, because light with positive phase on an edge of the phase inversion pattern superposes and counteracts light with phase reversed 180° after the light passes through the phase inversion pattern to present black state when light transmits through the color filter substrate. And the display panel with the color filter substrate can prevent light leakage due to bending.

At least one embodiment of the disclosure provides a color filter substrate including a base substrate, and a color filter layer and a phase inversion pattern which are disposed on the base substrate, wherein the phase inversion pattern includes a plurality of openings corresponding to a plurality of color filter units of the color filter layer, and the phase inversion pattern defines a boundary of each of the color filter units; a projection of the phase inversion pattern on the base substrate at least partially covers a projection of an area between adjacent color filter units on the base substrate; the phase inversion pattern is configured to allow light passing through the phase inversion pattern to undergo phase inversion.

For example, according to the color filter substrate provided by an embodiment of the disclosure, a phase inversion angle of the light passing through the phase inversion pattern is 180°.

For example, according to the color filter substrate provided by an embodiment of the disclosure, further includes a black matrix pattern, wherein the black matrix pattern is correspondingly disposed between adjacent color filter units, and a width of the black matrix pattern is less than a width of the area between adjacent color filter units at a corresponding position.

For example, according to the color filter substrate provided by an embodiment of the disclosure, the phase inversion pattern is hollowed at a position where the black matrix pattern is provided.

For example, according to the color filter substrate provided by an embodiment of the disclosure, a material of the phase inversion pattern includes any one selected from the group consisted of chromium oxide (CrOx), chromium nitrogen oxide (CrOxNy) Molybdenum silicon oxide (MoSiOx), tantalum silicon oxide (TaSiOx), titanium nitrogen oxide (TiOxNy).

At least one embodiment of the disclosure further provides a display panel including an array substrate and any one of the above-mentioned color filter substrate.

For example, according to the display panel provided by an embodiment of the disclosure, the array substrate and the color filter substrate are cell-assembled to form a liquid crystal cell, and a polarizer is provided on a surface of the color filter substrate away from the array substrate after the array substrate and the color filter substrate are cell-assembled, and the phase inversion pattern is provided on a surface of the polarizer away from the color filter substrate.

For example, according to the display panel provided by an embodiment of the disclosure, the array substrate includes a plurality of first signal lines and a plurality of second signal lines, and the plurality of first signal lines intersects the plurality of second signal lines to define a plurality of sub-pixel units corresponding to the color filter units of the color filter substrate, and the phase inversion pattern is provided on a position corresponding to the plurality of first signal lines and the plurality of second signal lines.

For example, according to the display panel provided by an embodiment of the disclosure, a material of the plurality of first signal lines and the plurality of second signal lines includes an opaque conductive material, and a width of each of the first signal lines and the second signal lines is less than or equal to a width of the area between adjacent color filter units at a corresponding position.

For example, according to the display panel provided by an embodiment of the disclosure, the display panel includes a flat display panel or a curved display panel.

At least one embodiment of the disclosure further provides a display device including ally one of the above-mentioned display panel.

At least one embodiment of the disclosure further provides a manufacturing method of a display panel including forming an array substrate and a color filter substrate, wherein forming the color filter substrate includes forming a color filter layer and a phase inversion pattern on the base substrate, wherein the phase inversion pattern includes a plurality of openings corresponding to a plurality of color filter units of the color filter layer, and the phase inversion pattern defines a boundary of each of the color filter units; and a projection of the phase inversion pattern on the base substrate at least partially covers a projection of an area between adjacent color filter units on the base substrate; and the phase inversion pattern is configured to allow light passing through the phase inversion pattern to undergo phase inversion.

For example, according to the manufacturing method of the display panel provided by an embodiment of the disclosure, further includes cell-assembling the array substrate and the color filter substrate to form a liquid crystal cell, wherein a polarizer is provided on a surface of the color filter substrate away from the array substrate after the array substrate and the color filter substrate are cell-assembled, and the phase inversion pattern is formed on a surface of the polarizer away from the color filter substrate.

For example, according to the manufacturing method of the display panel provided by an embodiment of the disclosure, further includes bending the display panel to form a curved display panel.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

REFERENCE NUMERALS

100—color filter substrate; 101—base substrate; 102—color filter layer; 1021—red color filter pattern; 1022—green color filter pattern; 1023—blue color filter pattern; 103—color filter unit; 1031—red filter unit; 1032—green filter unit; 1033—blue filter unit; 104—phase inversion pattern; 1041—opening; 105—black matrix pattern; 106—polarizer; 110—array substrate; 1101—base substrate, 111—signal line, 112—sub-pixel unit, 113—insulating layer, 114—passivation layer, 115—black matrix pattern, 200—liquid crystal cell.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," "the," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1A:
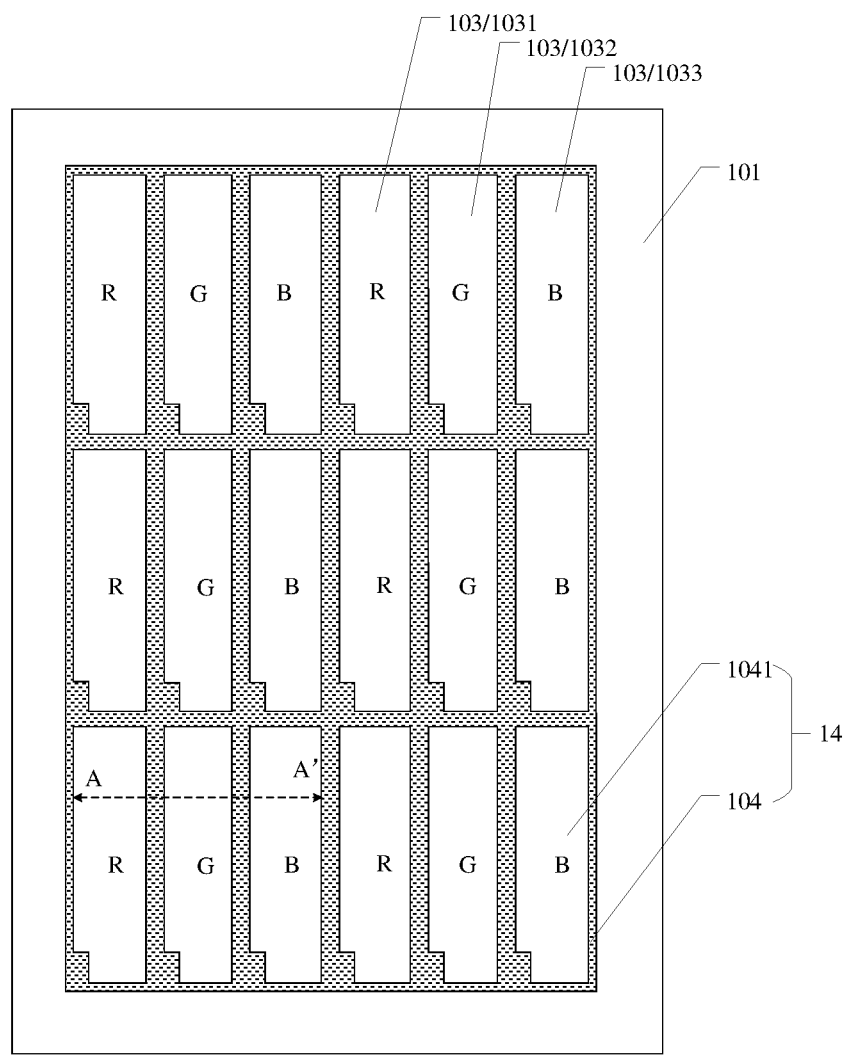
FIG. 1a is a plane schematic view of a color filter substrate provided by an embodiment of the disclosure.
Figure 1B:
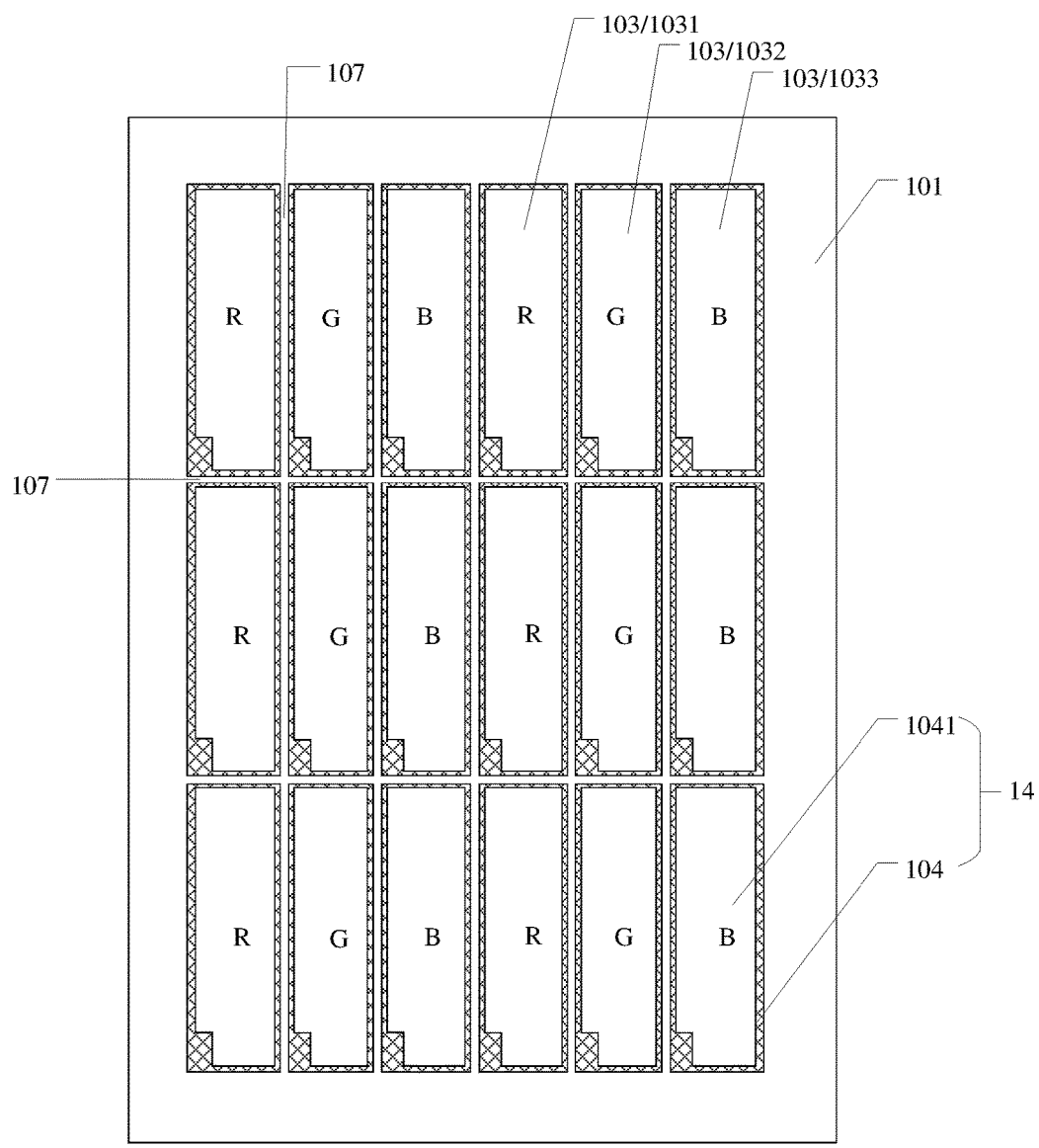
FIG. 1b is a plane schematic view of another color filter substrate provided by an embodiment of the disclosure.
Figure 3:
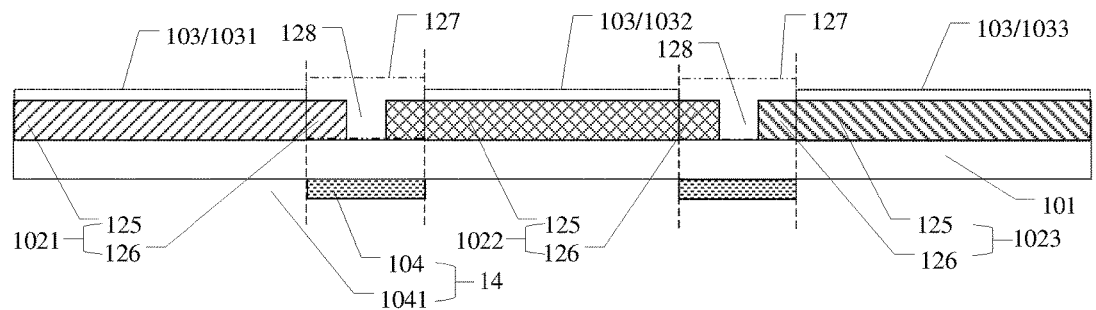
FIG. 3 is a cross-sectional schematic view of a color filter substrate provided by an embodiment of the disclosure (for example, a cross-sectional schematic view taken along line A-A' of FIG. 1)
Figure 4A:
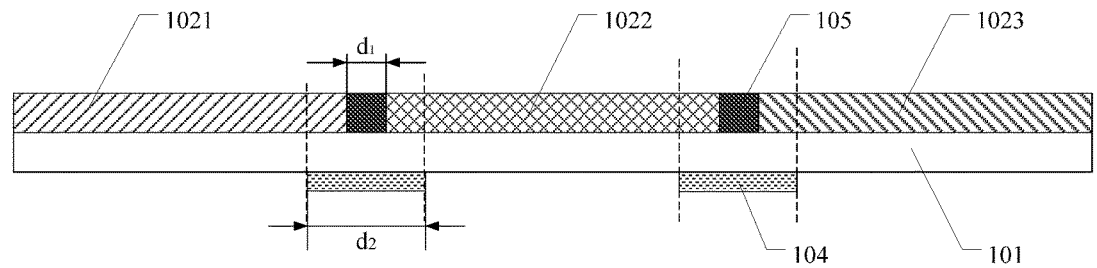
FIG. 4a is a cross-sectional schematic view of another color filter substrate provided by an embodiment of the disclosure (for example, a cross-sectional schematic view taken along line A-A' of FIG. 1)
Figure 4B:
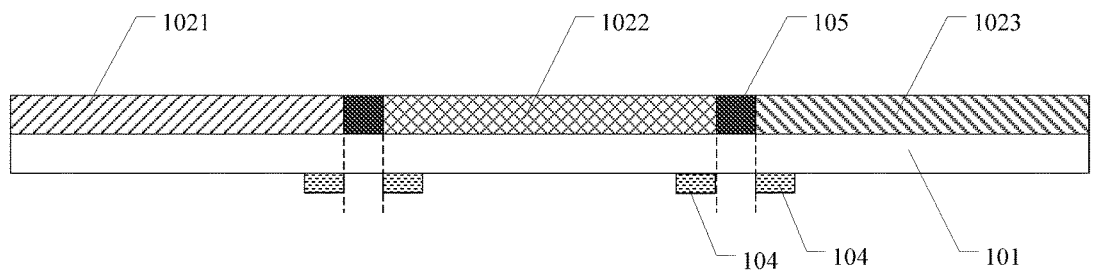
FIG. 4b is a cross-sectional schematic view of another color filter substrate provided by an embodiment of the disclosure (for example, a cross-sectional schematic view taken along line A-A' of FIG. 1)

At least one embodiment of the disclosure provides a color filter substrate, a display panel and a display device. As illustrated in FIG. 1a and FIG. 1b, the color filter substrate includes a base substrate 101, and a color filter layer 102 and a phase inversion layer 14 which are disposed on the base substrate 101. The color filter layer 14 comprises a plurality of color filter patterns (for example, the red filter pattern 1021, the green filter pattern 1022, and the blue filter pattern 1023 as illustrated in FIG. 4a), and each color filter pattern comprises a first portion 125 and a second portion 126. The first portions 125 serve as a plurality of color filter units 103 of the color filter layer. The phase inversion layer 14 comprises a phase inversion pattern 104, and a plurality of openings 1041 respectively corresponding to the plurality of color filter units 103 of the color filter layer, and the phase inversion pattern 104 defines a boundary of each of the color filter units 103. As illustrated in FIGS. 3, 4a and 4b, the phase inversion pattern 104 covers the second portions 126 in an area 127 between adjacent color filter units 103 along the direction perpendicular to the base substrate. For example, as illustrated in FIG. 3, the phase inversion pattern 104 further covers an area 128 between adjacent color filter patterns along the direction perpendicular to the base substrate.

For example, a plurality of openings 1041 corresponding to a plurality of color filter units 103 of the color filter layer means the plurality of openings 1041 coincides with the plurality of color filter units 103 along a direction perpendicular to the base substrate 101.

The phase inversion pattern 104 is configured to allow light passing through the phase inversion pattern to undergo phase inversion, for example, to let the light passing through the phase inversion pattern have a phase inversion angle of 180°.

For example, as illustrated in FIG. 1a, a projection of the phase inversion pattern 104 on the base substrate 101 completely covers a projection of an area between adjacent color filter units 103 on the base substrate.

For example, as illustrated in FIG. 1b, a projection of the phase inversion pattern 104 on the base substrate 101 partially covers a projection of the area between adjacent color filter units 103 on the base substrate. Except the portion covered by the projection of the phase inversion pattern 104 on the base substrate 101, the projection of the area between adjacent color filter units 103 on the base substrate further includes a hollowed portion 107 which is not covered by the projection of the phase inversion pattern 104 on the base substrate 101.

Figure 2:
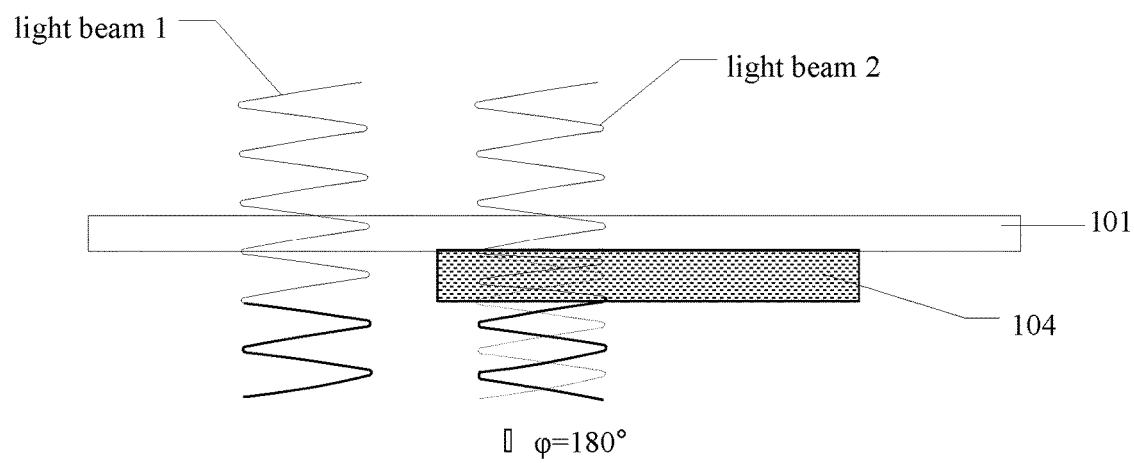
FIG. 2 is a schematic view of phase inversion principle provided by an embodiment of the disclosure.

As illustrated in FIG. 2, a light beam 1 and a light beam 2 which have the same phase pass through the base substrate 101 and emit out in the vicinity of a position where the phase inversion pattern 104 is provided. The phase of light beam 1 does not change after the light beam 1 passes through the base substrate 101, and the phase of light beam 2 transmitted through the base substrate 101 and the phase inversion pattern 104 is inverted by 180° due to the function of the phase inversion pattern 104. Thus, the light beam 1 superposes and counteracts the light beam 2 with an inverted phase of 180°, that is, a black state is presented after the two light beams are superposed, so that a region corresponding to the phase inversion pattern or its edges can exhibit an extinction region, thus the phase inversion pattern can replace or partially replace the black matrix. For example, the phase inversion layer 104 provided on the base substrate 101 of the color filter substrate can replace or partially replace the black matrix, because when light transmits, light with positive phase at the phase inversion pattern or its edges superposes light with a reversed phase of 180° to present a black state. Further, when the color filter substrate is used for a curved display panel or a curved display device, the curved display panel or the curved display device with the color filter substrate can prevent light leakage due to bending. It should be noted that FIG. 2 is only a schematic representation. For example, a direction of the light beam is not limited to that illustrated in the figure, but can be a light beam in other directions. For example, vibrations counteract after the superposition of two light beams with the same frequency, the same direction, and opposite phase. Of course, the light passing through the phase inversion pattern can also inverse other angles, 180° is only a preferred angle.

Several embodiments will be described in the following.

First Embodiment

The embodiment provides a color filter substrate, as illustrated in FIG. 1a, including a base substrate 101, and a color filter layer 102 and a phase inversion pattern 104 which are disposed on the base substrate 101. The color filter layer 102 includes a plurality of color filter units 103. For example, the color filter units 103 can include a red filter unit 1031, a green filter unit 1032, and a blue filter unit 1033. For example, the color filter units 103 are disposed in arrays on the base substrate 101. It should be noted that the color filter layer 102 includes, but is not limited to, the red, green, and blue filter units described in this embodiment, and can include filter units of other colors.

As illustrated in FIG. 1a, the phase inversion pattern 104 includes a plurality of openings 1041 corresponding to a plurality of color filter units 103 of the color filter layer. For example, one opening 1041 corresponds to one color filter unit 103, and the phase inversion pattern 104 is configured to define a boundary of each of the color filter units 103. A projection of the phase inversion pattern 104 on the base substrate 101 at least partially covers a projection of an area between adjacent color filter units 103 on the base substrate. The plurality of openings 1041 allows light passing through the color filter units 103 to emit out and realize color display.

As illustrated in FIGS. 1a, 1b and 3, in a row direction, the red filter unit 1031, the green filter unit 1032, and the blue filter unit 1033 constitute one pixel unit, and are arranged in sequence from the left to the right on the base substrate 101. In the same row, a plurality of pixel units is provided. It should be noted that the red filter unit 1031, the green filter unit 1032, and the blue filter unit 1033 can be arranged in other arrangement, limitations are not imposed thereto. For example, the phase inversion pattern 104 can be provided on a surface of the base substrate 101 away from a side where the color filter layer (the red filter pattern 1021, the green filter pattern 1022, and the blue filter pattern 1023) is provided. The color filter layer and the phase inversion pattern can also be located on the same side of the base substrate.

For example, a thickness of the phase inversion pattern can be calculated by following formula:

$$d = \lambda \cdot \Delta\varphi / 2\pi(n-1)$$

where $\Delta\varphi$ is a phase inversion angle (for example, $\Delta\varphi$ is $\pi$), d is a thickness of a phase inversion pattern, $\lambda$ is a wavelength of light, n is a refraction index of a phase shift pattern.

For example, the color filter substrate provided in the present embodiment can further include a black matrix pattern 105. As illustrated in FIG. 4a, the color filter substrate further includes a black matrix pattern 105 provided on the base substrate 101. For example, the black matrix pattern is correspondingly disposed between adjacent filter units 103, and a width of the black matrix pattern 105 is less than a width of the area between adjacent filter units 103 at a corresponding position. For example, a width of the projection of the black matrix pattern 105 on the base substrate is less than a width of the area between adjacent filter units 103 on the base substrate at the corresponding position. For example, the black matrix pattern 105 is provided on the same side as the red filter unit 1031, the green filter unit 1032, and the blue filter unit 1033 (on the same side of the base substrate 101). The black matrix pattern 105 includes a plurality of openings corresponding to the color filter unit 103 to allow light to pass through the color filter units 103.

For example, as illustrated in FIG. 4a, a width of the phase inversion pattern 104 can be equal to a width of an area between adjacent filter units 103 at a corresponding position. For example, the black matrix pattern 105 can be located at a gap between adjacent color filter patterns and the width of the black matrix pattern 105 is less than the width of the gap between adjacent color filter patterns at a corresponding position. The black matrix pattern 105 cooperates with the phase inversion pattern 104 to separate (define) the adjacent color filter units 103. For example, a width d2 of the phase inversion pattern 104 corresponding to a portion between adjacent color filter units 103 is larger than a width d1 of the black matrix pattern 105 at a corresponding position. It should to be noted that the projection of the phase inversion pattern 104 on the base substrate 101 completely covers the projection of the area between adjacent color filter units 103 on the base substrate in the present embodiment.

For example, as illustrated in FIG. 4b, the phase inversion pattern 104 can be provided only on an outer side of the black matrix pattern 105. For example, the phase inversion pattern 104 is provided on both sides of the black matrix pattern 105, respectively. For example, the phase inversion pattern 104 is hollowed at a position where the black matrix pattern 105 is provided, and a projection of the phase inversion pattern 104 on the base substrate 104 partially covers a projection of the area between adjacent color filter units 103 on the base substrate. For example, the corresponding phase inversion pattern 104 can be as illustrated in FIG. 1b. For example, a projection of the hollowed portion 107 of the phase inversion pattern 104 on the base substrate 101 corresponds to and has the same width with a projection of the black matrix pattern 105 on the base substrate 101, the width of which is the same.

It should be noted that, in the case that the black matrix pattern 105 is provided without the phase inversion pattern 104, diffraction phenomenon occurs when light passes through the color filter units 103, and the light passing through adjacent color filter units 103 enters a region corresponding to the black matrix pattern 105, so that a light shielding region of the black matrix pattern 105 is less than a width of the black matrix pattern 105, resulting in various defects such as color mixing and light leakage. In general, in order to achieve better light shielding effect and improve picture quality, the black matrix pattern 105 has to be provided with a wider width, thereby reducing the aperture ratio. In this case, there is a need to increase backlight to achieve the brightness required by the product, resulting in a significant increase in product cost and power consumption. The phase inversion pattern 104 of the present embodiment can at least partially replace the black matrix and has a function of the black matrix. For example, the phase inversion pattern has an extinction effect at its edges, and a limited extinction effect in its middle region, thus the black matrix pattern 105 cooperates with the phase inversion pattern 104 of the present embodiment to provide a better light shielding effect and obtain a larger light shielding range. In this embodiment, by combining the black matrix pattern 105 with the phase inversion pattern 104, using phase inversion, superposing light passing through the phase inversion pattern 104 and light diffracted into the region corresponding to the phase inversion pattern to achieve a better light shielding effect. At the same time, the black matrix pattern 105 does not need to be provided with a large width, thereby reducing the cost and power consumption of the product.

Figure 5:
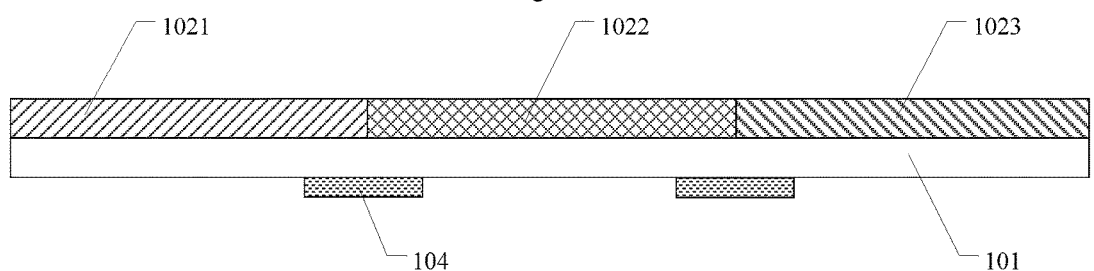
FIG. 5 is a cross-sectional schematic view of another color filter substrate provided by an embodiment of the disclosure (for example, a cross-sectional schematic view taken along line A-A' of FIG. 1)
Figure 6:
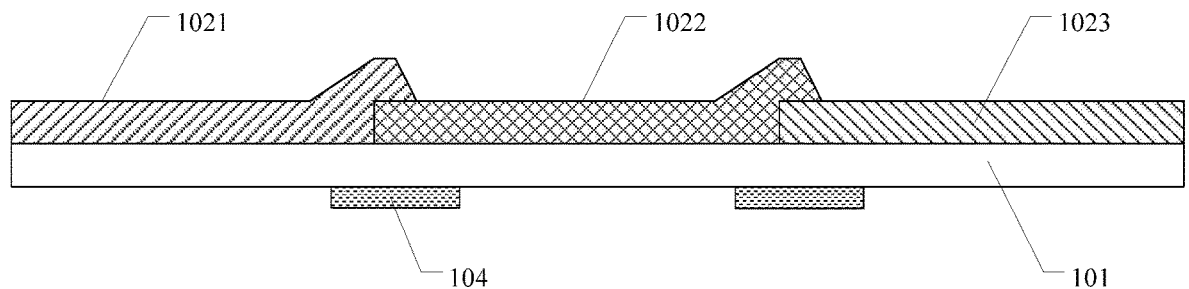
FIG. 6 is a cross-sectional schematic view of another color filter substrate provided by an embodiment of the disclosure (for example, a cross-sectional schematic view taken along line A-A' of FIG. 1)

For example, in the color filter substrate provided by the present embodiment, the color filter units of different colors are derived from a plurality of color filter patterns having different colors, and the same color filter unit is derived from the color filter pattern of the same color. In the color filter patterns of different colors, adjacent color filter patterns are connected to each other, are not in contact with each other, or have portions overlapping with each other. As illustrated in FIG. 5, the adjacent red filter pattern 1021 and the green filter pattern 1022 are connected to each other, and the adjacent green filter pattern 1022 and the blue filter pattern 1023 are connected to each other. As illustrated in FIG. 3, the adjacent red filter pattern 1021 and the green filter pattern 1022 are not in contact with each other and are spaced apart from each other with a certain distance, and the adjacent green filter pattern 1022 and the blue filter pattern 1023 are not in contact with each other and are spaced apart from each other with a certain distance. For example, the color filter layer and its preparation can be found in the usual design. As illustrated in FIG. 6, the adjacent red filter pattern 1021 and the green filter pattern 1022 have portions overlapping with each other, and the adjacent green filter pattern 1022 and the blue filter pattern 1023 have portions overlapping with each other. It should be noted that, in the case where the color filter substrate provided in the present embodiment includes the black matrix pattern 105, in a case that the adjacent color filter patterns are connected to each other or have portions overlapping with each other, the black matrix pattern 105 can be located on or under the color filter layer, in a case where the adjacent color filter patterns are not contacted with each other, the black matrix pattern 105 can be filled at least in the gap between the adjacent color filter patterns.

Figure 8:
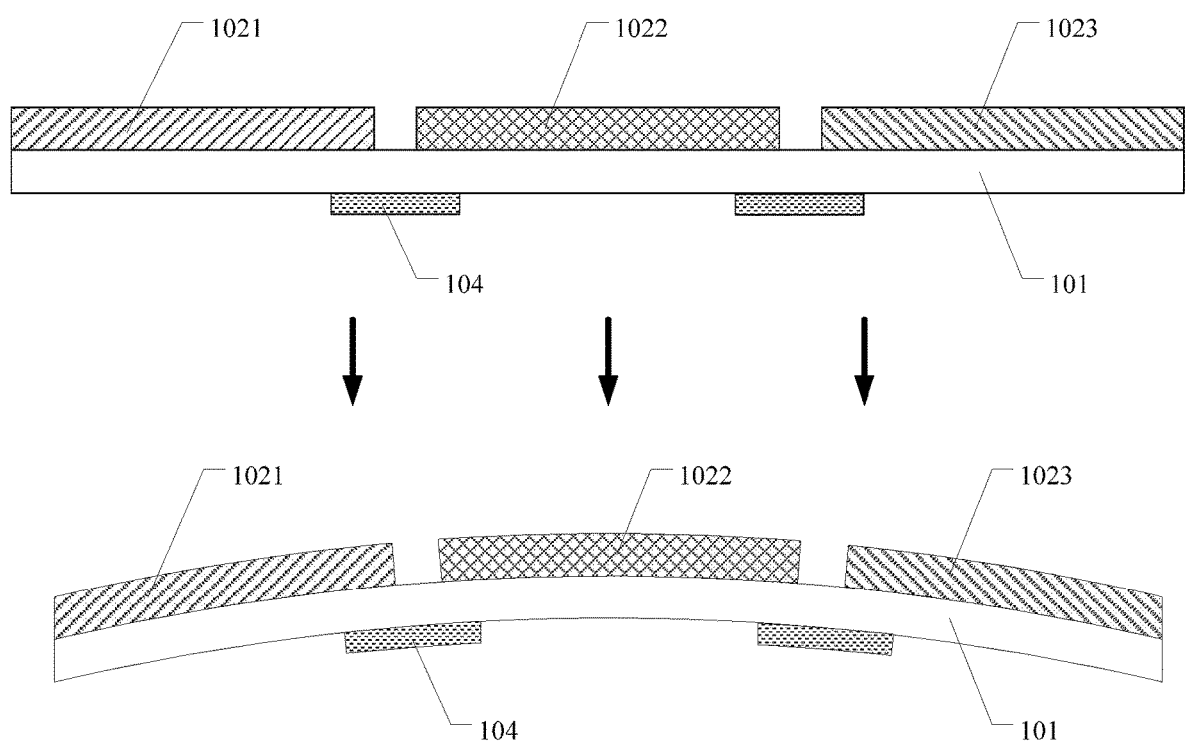
FIG. 8 is a schematic view of bending a color filter substrate provided by an embodiment of the disclosure.

For example, the color filter substrate provided by any of the above-mentioned examples of the present disclosure can be used for a flat panel display panel or a curved display panel. FIG. 8 is a schematic cross-sectional view of bending a color filter substrate according to an embodiment of the present disclosure.

Figure 7:
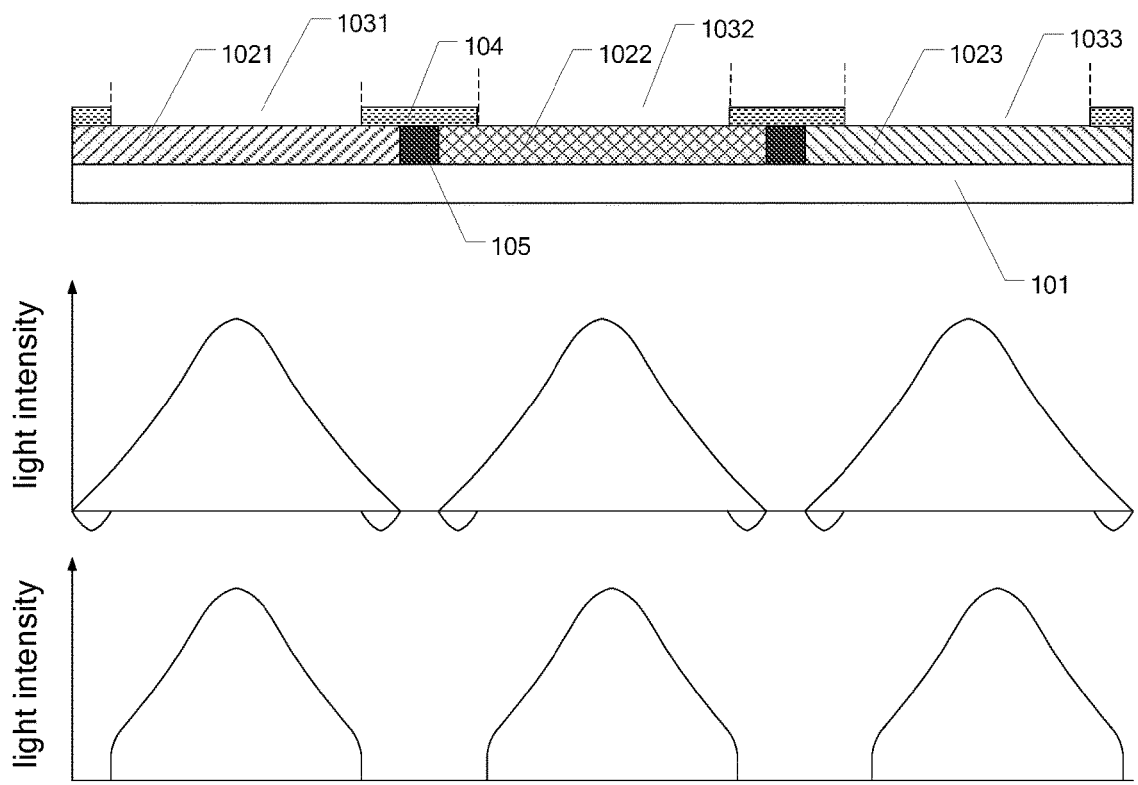
FIG. 7 is a schematic view of phase inversion principle of a color filter substrate provided by an embodiment of the disclosure.

As illustrated in FIG. 7, at a position corresponding to the phase inversion pattern 104, light passing through the color filter units superposes light passing through the phase inversion pattern 104 with a phase inverted by 180°, to present a black state, so as to achieve the effect of light shielding. For example, the light passing through the phase inversion pattern 104 can counteract a diffracted light. In FIG. 7, the extinction region at the edges of the phase inversion pattern and the black matrix pattern work together to provide a better light shielding effect. It is possible to provide no black matrix pattern on the color filter substrate. In this case, the phase inversion pattern can cooperate with the plurality of signal lines provided on the array substrate (referring to first signal lines and second signal lines in the following second embodiment) to play a better role in light shielding. The light shielding region in FIG. 7 (for example, the region corresponding to where the intensity of light is 0) is a region corresponding to the phase inversion pattern. On the other hand, as illustrated in FIG. 7, because the phase inversion pattern can transmit light, and the phase of the light passing through the phase inversion pattern can be reversed by 180°, and light with a phase reversed by 180° at edges of the phase inversion pattern can superposes light which phase is not reversed to generate an extinction phenomenon, and counteract diffracted light, to obtain a larger light shielding range. In the process of preparing a display panel with the color filter substrate provided in the present embodiment, without lowering the aperture ratio, it is possible to tolerate a large cell-assembling deviation due to that the phase inversion pattern is employed. In the process of preparing a curved display panel with the color filter substrate provided in the present embodiment, the light leakage phenomenon due to bending can be avoided due to the extinction mechanism (two light with a phase difference of 180° superposes to generate extinction) of the region corresponding to the phase inversion pattern, thus solving the problem of light leakage caused by the use of black matrix alone. In addition, when a display panel is bent to prepare a curved display panel, a thickness of the black matrix pattern in a conventional display panel or color filter substrate is reduced, so that the effect of light shielding is weakened. On the contrary, in the case of using the color filter substrate of the present embodiment, because no black matrix pattern is provided or the black matrix pattern is only be provided with a narrower width, it is possible to avoid or reduce the reduction of the light shielding effect due to the decrease in thickness of the black matrix.

It should be noted that, the present embodiment is illustrated by taking the color filter layer and the phase inversion pattern are respectively provided on both sides of the base substrate 101 as an example, but not limited to this. For example, the color filter layer and the phase inversion pattern can be located on the same side of the base substrate 101.

Second Embodiment

Figure 9:
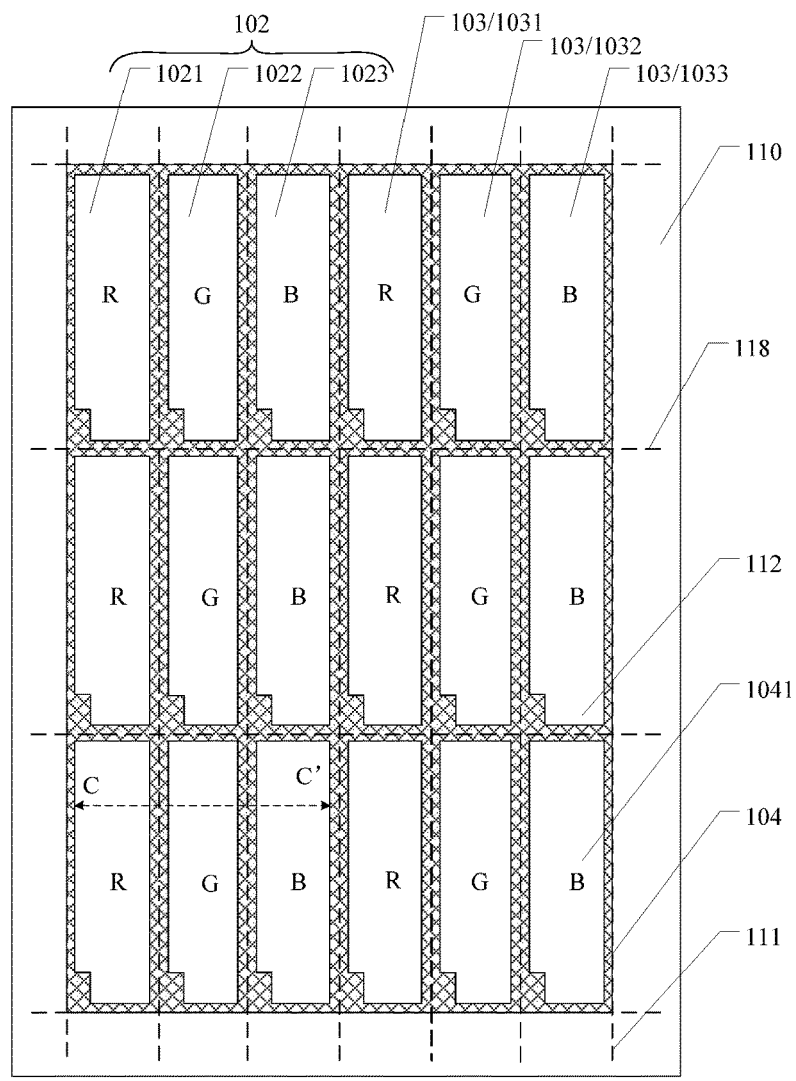
FIG. 9 is a plane schematic view of a display panel provided by an embodiment of the disclosure.

The present embodiment provides a display panel, as illustrated in FIG. 9, which includes an array substrate 110 and any one of the color filter substrates described in the first embodiment.

For example, in one example of the present embodiment, the array substrate 110 can include a plurality of first signal lines 111 and a plurality of second signal lines 118, the plurality of first signal lines 111 intersects the plurality of second signal lines 118 to define a plurality of sub-pixel units 112. For example, the first signal line 111 is a vertical data line, and the second signal line 118 is a horizontal gate line. A plurality of gate lines intersects a plurality of data lines to define a plurality of sub-pixel units 112. The sub-pixel units 112 correspond to the color filter units 103 of the color filter substrate. For example, the plurality of sub-pixel units 112 defined by the plurality of first signal lines 111 and the plurality of second signal lines 118 which are crossed correspond to the red filter unit 1031, the green filter unit 1032, and the blue filter unit 1033, respectively, and each of the sub-pixel units 112 corresponds to each of the color filter units 103. As a result, light of one color can be emitted out from a region corresponding to one sub-pixel unit 112 (color filter unit 103), and one pixel unit is composed of a plurality of sub-pixel units 112 (color filter unit 103) can display various colors by combination of different brightness of the sub-pixel unit 112 (color filter unit 103), so that the display panel can display a color picture. Thus, it is important to avoid color mixing and light leakage of adjacent sub-pixel units 112 for ensuring the quality of the display picture. As illustrated in FIG. 9, the phase inversion pattern 104 can be provided at a position corresponding to the plurality of first signal lines 111 and second signal lines 118. Upon light transmission, light with positive phase at edges of the phase inversion pattern superposes light passing through the phase inversion pattern with a reversed phase of 180°, a black state is presented after superposition, and thereby a light shielding effect can be achieved.

It is to be noted that, in FIG. 9, the plurality of first signal lines 111 and the plurality of second signal lines 118 are disposed on the array substrate, and FIG. 9 is used to clearly describe and help to understand the position of the phase inversion pattern with respect to the first signal line 111 and the plurality of second signal lines 118.

Figure 10:
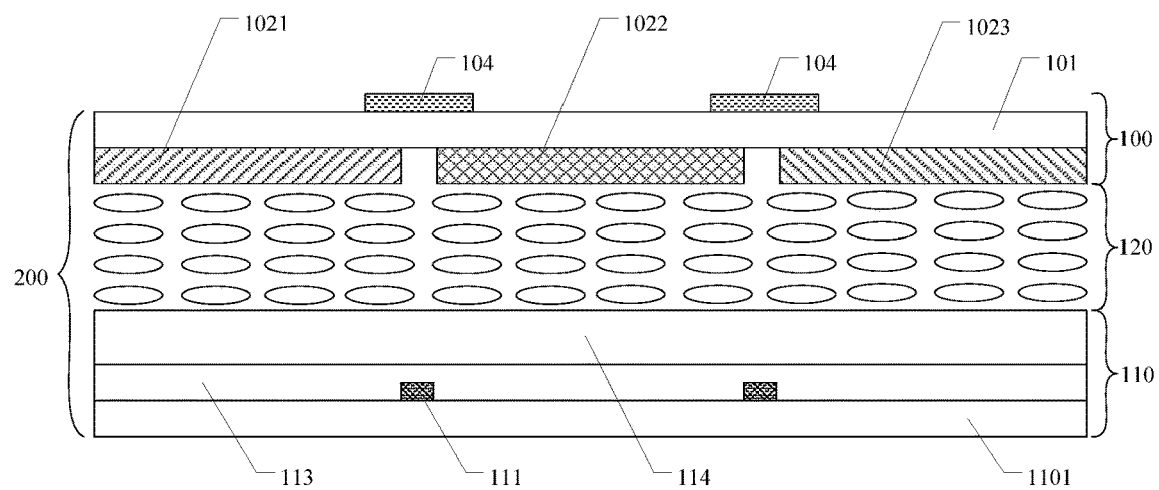
FIG. 10 is a cross-sectional schematic view of a display panel provided by an embodiment of the disclosure (for example, a cross-sectional view taken along line C-C' of FIG. 9)

For example, as illustrated in FIG. 10, the display panel further includes a liquid crystal layer 120 disposed between the array substrate 110 and the color filter substrate 100. The liquid crystal cell 200 includes the array substrate 110, the color filter substrate 100, and the liquid crystal layer 120. The array substrate 110 includes a base substrate 1101, and a plurality of first signal lines 111 provided on the base substrate 1101. An insulating layer 113 can be provided on the plurality of first signal lines 111, and a passivation layer 114 can be provided on the insulating layer 113. Further, as illustrated in FIG. 10, the phase inversion pattern 104 can be provided to be opposed to the first signal line 111 to reduce or avoid defects such as light leakage or color mixing between adjacent sub-pixel units 112. The present embodiment is illustrated by taking the phase inversion pattern corresponds to first signal lines and second signal lines as an example, and only a sectional view taken along line C-C' is illustrated in FIG. 10.

For example, in the display panel provided in the present embodiment, a material of the first signal lines 111 and the second signal lines 118 includes an opaque conductive material. As a result, the first signal lines 111 and the second signal lines 118 can play a role in light shielding in a certain extent. In this case, the phase inversion pattern 104 is at least provided at a position corresponding to at least the first signal line 111 and the second signal line 118 or a position the outer side thereof. It is to be noted that the phase inversion pattern 104 of the present embodiment can be provided only on the outer sides of the first signal lines 111 and the second signal lines 118. That is, a width of each of the first signal lines 111 and second signal lines 118 is less than or equal to a width of the area between adjacent color filter units at a corresponding position. For example, a projection of the hollowed portion 107 of the phase inversion pattern 104 on the base substrate 101 corresponds to a projection of the first signal lines 111 and the second signal lines 118 on the base substrate 101. Of course, the phase inversion pattern 104 between adjacent color filter units 103 can be provided without the hollowed portion, and the projection of the phase inversion pattern 104 on the base substrate 101 can completely covers the projection of the area between adjacent color filter units 103 on the substrate.

It is to be noted that the first signal lines 111 and the second signal lines 118 of the present embodiment are opaque and have a function of light shielding to a certain extent. Therefore, in a case where the black matrix is not provided on the color filter substrate, the phase inversion pattern 104 can cooperate with the first signal lines and the second signal lines (the first signal lines and the second signal lines are opaque) of the array substrate, to play a better light shielding effect. The first signal lines 111 and the second signal lines 118 cooperate with the phase inversion pattern 104 of the present embodiment to provide a better light shielding effect and to obtain a larger light shielding range.

It should be noted that, in a case where the black matrix pattern 115 is provided alone, light passing through the sub-pixel units 112 will generate diffraction phenomenon, and light passing through adjacent sub-pixel units 112 enters a light shielding region of the black matrix pattern 115, resulting in various defects such as color mixing and light leakage. Therefore, in order to achieve a better light shielding effect and improve the picture quality, the black matrix pattern 115 has to be provided with a large width, thereby reducing the aperture ratio. In this case, it is necessary to provide a wider width of the backlight to achieve the brightness of the product required, resulting in greatly increase of product cost and power consumption. In this embodiment, the black matrix pattern 115 or the plurality of signal lines are arranged in cooperation with the phase inversion pattern 104, and light passing through the phase inversion pattern 104 superposes light diffracted or transmitted into the light shielding region by phase inversion to achieve a better light shielding effect. Meanwhile, in the case where a black matrix is provided, the black matrix pattern 115 has no a need to be provided with a larger width, thereby reducing the cost and power consumption of the product.

Figure 11:
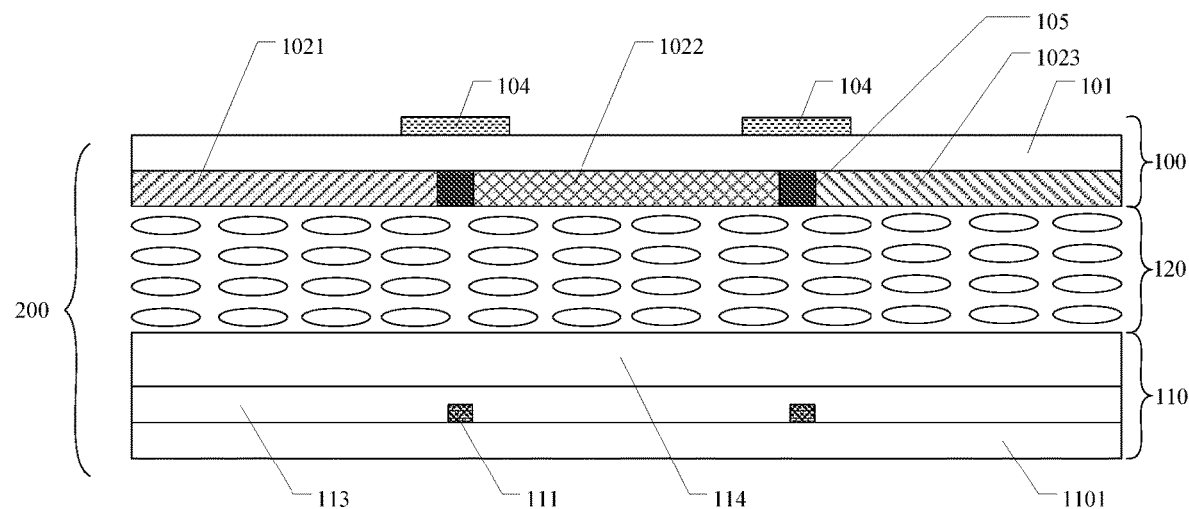
FIG. 11 is a cross-sectional schematic view of another display panel provided by an embodiment of the disclosure (for example, a cross-sectional view taken along line C-C' of FIG. 9)

For example, in the display panel provided in the present embodiment, in the case where the color filter substrate 100 includes the black matrix pattern 105, the display panel can be as illustrated in FIG. 11, and the specific configuration thereof can also refer to FIGS. 4a and 4b and relevant description of the first embodiment, repeated portions will be omitted here.

Figure 12:
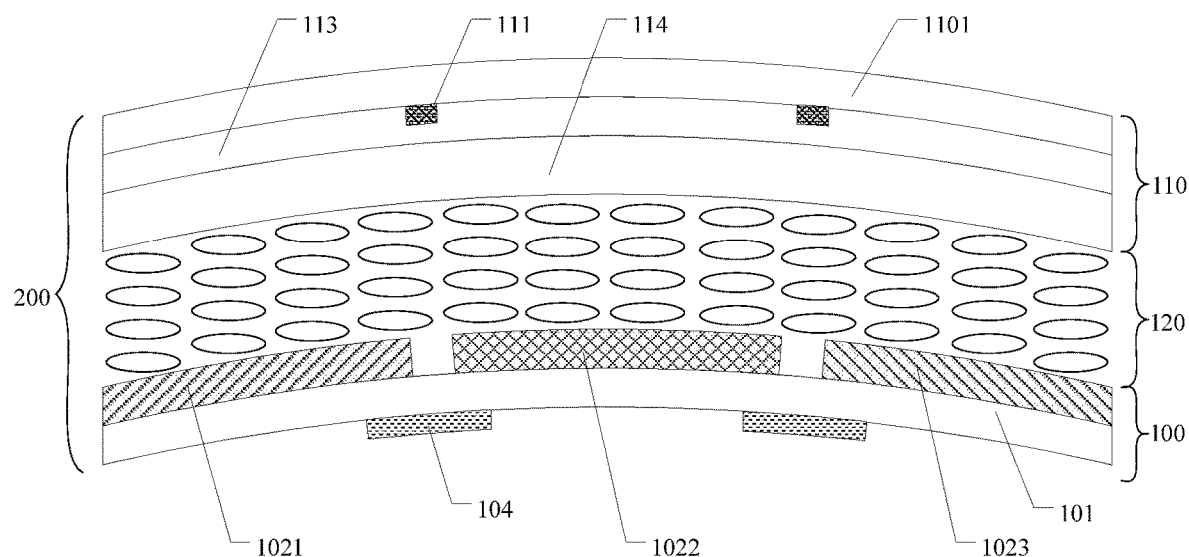
FIG. 12 is a cross-sectional schematic view of a curved display panel provided by an embodiment of the disclosure (for example, a cross-sectional view taken along line C-C' of FIG. 9)

For example, the display panel provided in the present embodiment can include a flat display panel and a curved display panel. As illustrated in FIG. 12, the display panel of the present embodiment can be a curved display panel. On the other hand, since the phase inversion pattern can transmit light and a phase of the light passing through the phase inversion pattern can be reversed by 180°, light with a reversed phase of 180° can superposes light without phase inversion to generate extinction phenomenon, and can get a larger light shielding range. In the process of preparing a curved display panel using the display panel provided in the present embodiment, the light leakage phenomenon due to bending can be avoided, thereby solving the problem of light leakage caused by the usual black matrix. In addition, since it is possible to not provide the black matrix pattern or the black matrix pattern can be provided with a narrower width than that of the conventional black matrix, the reduction of the light shielding effect due to the decrease in thickness of the black matrix can be reduced or avoided during bending.

For example, in the display panel provided in the present embodiment, in the color filter patterns of different colors of the color filter substrate 100, adjacent color filter patterns are connected to each other, not in contact with each other or have overlapping portions with each other, the specific configuration of which can refer to FIGS. 3 to 5 and relevant descriptions of the first embodiment, repeated portions will be omitted here.

It is should be noted that, the present embodiment is illustrated by taking the color filter layer and the phase inversion pattern are respectively provided on two sides of the base substrate 101 as an example, but not limited to this. For example, the color filter layer and the phase inversion pattern can be located on the same side of the base substrate 101.

Third Embodiment

Figure 13A:
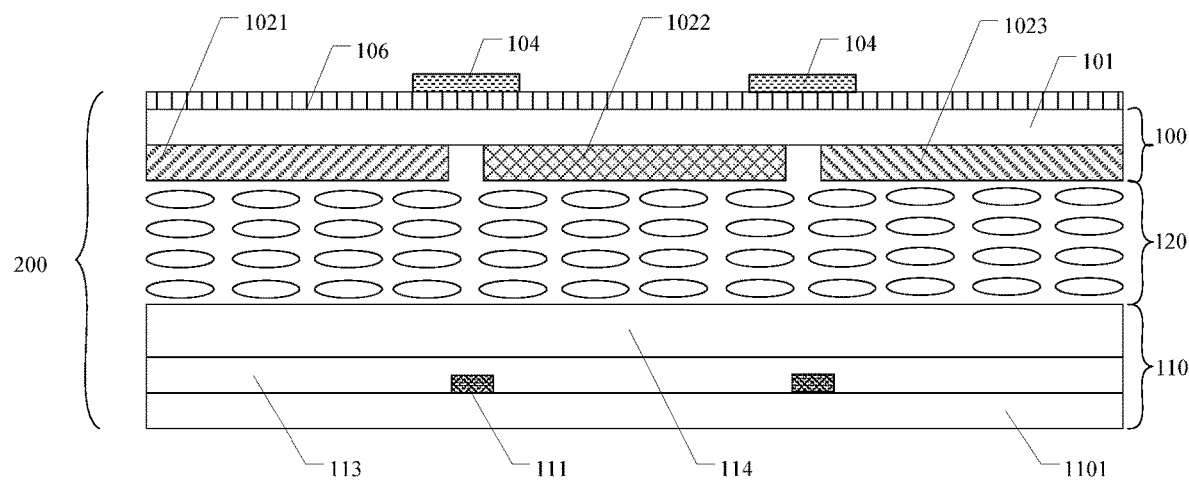
FIG. 13a is a cross-sectional schematic view of another display panel provided by an embodiment of the disclosure (for example, a cross-sectional view taken along line C-C' of FIG. 9)

The present embodiment provides a display panel, as illustrated in FIG. 13a. The display panel includes a liquid crystal cell 200, and an array substrate 110 and a color filter substrate 100 are cell-assembled to constitute a liquid crystal cell 200, and the liquid crystal cell 200 further includes a liquid crystal layer 120 disposed between the color filter substrate 100 and the array substrate 110.

Figure 13B:
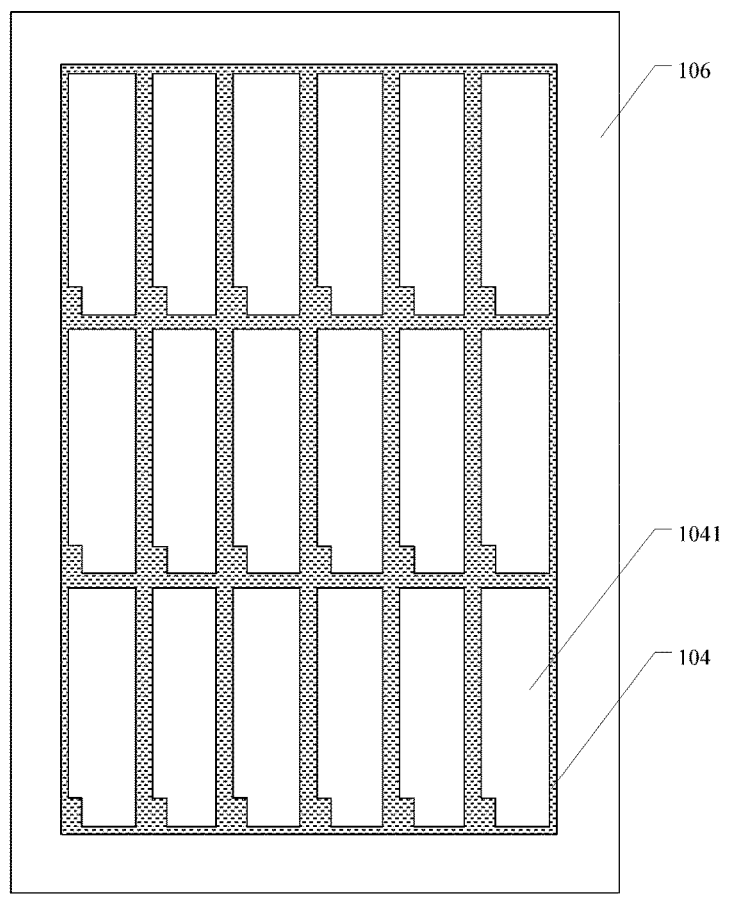
FIG. 13b is a cross-sectional schematic view of a phase inversion pattern of another display panel provided by an embodiment of the disclosure (for example, a cross-sectional view taken along line C-C' of FIG. 9).

A polarizer 106 is provided on a surface of the color filter substrate away from the array substrate after the array substrate and the color filter substrate are cell-assembled, and the phase inversion pattern 104 is disposed on a surface of the polarizer 106 away from the color filter substrate 100. The phase inversion pattern 104 disposed on the surface of the polarizer 106 away from the color filter substrate 100 can refer to FIG. 13b.

The present embodiment is different from the display panel provided in the above embodiments in that the phase inversion pattern 104 is not provided on the base substrate 101 of the color filter substrate, but is provided on a surface of the color filter substrate away from the array substrate after the array substrate and the color filter substrate are cell-assembled.

It should be noted that each of the features in the display panel provided by the embodiments described above, for example, the color filter units, the color filter pattern, the phase inversion pattern, the black matrix pattern, and the first signal lines and the second signal lines are applicable to the present embodiment, and repeated portions will be omitted here.

It is to be noted that since the phase inversion pattern 104 in the present embodiment is formed on the polarizer 106, the phase inversion pattern 104 is formed after the liquid crystal cell 200 is formed, for example, the phase inversion pattern 104 is formed by a patterning process. Because the accuracy of patterning process is higher than that of cell-assembling, providing the phase inversion pattern 104 after cell-assembling, can greatly avoid decrease of light transmittance, and increase aperture ratio. For example, the decrease of light transmittance in the solution of the present embodiment can be controlled within 5%. And in conventional cases, the light transmittance is generally reduced in a range of 10%-15%. On the other hand, it is possible to reduce the width of the phase inversion pattern 104 under the premise of ensuring a high accuracy and a better light shielding effect, thereby greatly improving opening area, increasing aperture ratio, reducing cost, and improving display quality of a product.

In a process of preparing a curved display panel with the display panel provided by the present embodiment, the phase inversion pattern 104 is located on a surface of the polarizer 106 away from the color filter substrate 100. The polarizer 106 has good toughness and flexibility, and the phase inversion pattern 104 does not produce a large deviation with the bending of the polarizer 106, avoiding light leakage caused by bending, thereby solving the problem of light leakage by using a conventional black matrix. In addition, when a display panel is bent to manufacture a curved display panel, the thickness of the black matrix pattern in the conventional display panel or the color filter substrate is reduced, so that the effect of light shielding is weakened. On the contrary, in a case that the color filter substrate of the present embodiment is employed, because black matrix pattern can be not provided or a black matrix pattern with narrower width can be provided, it is possible to avoid or reduce the reduction of the light shielding effect due to the decrease in thickness of the black matrix.

For example, in the display panel provided by the present embodiment, the phase inversion pattern 104 is formed as follows. A phase inversion film is formed on a surface of the polarizer 106 away from the color filter substrate 100, a photoresist film is formed on the phase inversion film, then a patterned photoresist is formed (e.g., in a laser-drawn manner), and the phase inversion film is etched to form a phase inversion pattern 104. Moreover, the ways to form the phase inversion pattern 104 is not limited to the above-described method. The width of the phase inversion pattern ensures that no color mixing occurs at the junction of the color filter patterns.

For example, the display panel provided by the present embodiment can includes a flat display panel or a curved display panel.

Fourth Embodiment

The present embodiment provides a manufacturing method of the display panel of the second embodiment, including forming an array substrate 110 and a color filter substrate 100, wherein forming the color filter substrate 100 includes forming a color filter layer 102 and a phase inversion pattern 104 on the base substrate 101. The phase inversion pattern 104 includes a plurality of openings 1041 corresponding to a plurality of color filter units 103 of the color filter layer 102, and the phase inversion pattern 104 is configured to define a boundary of each of the color filter units 103; and a projection of the phase inversion pattern 104 on the base substrate 101 at least partially covers a projection of an area between adjacent color filter units 103 on the base substrate 101. The phase inversion pattern 104 is configured to allow light passing through the phase inversion pattern to undergo phase inversion.

Fifth Embodiment

The present embodiment provides a manufacturing method of the display panel of the third embodiment including the following steps.

Firstly, providing a liquid crystal cell 200 including an array substrate 110, a color filter substrate 100, and a liquid crystal layer 120 formed between the array substrate 110 and the color film substrate 100. For example, the array substrate 110 and the color filter substrate 100 are formed, and are cell-assembled to form a liquid crystal cell 200. For example, the step of forming the liquid crystal cell includes cell-assembling the array substrate 110 and the color filter substrate 100 and injecting a liquid crystal layer 120 between the array substrate 110 and the color filter substrate 100 to form the liquid crystal cell 200.

Forming the color filter substrate 100 includes forming a color filter layer 102 on the base substrate 101. The color filter layer 102 includes a plurality of color filter units 103. Details about the color filter units 103 can refer to descriptions of the embodiments above.

A polarizer 106 is provided on a surface of the color filter substrate away from the array substrate after the array substrate and the color filter substrate are cell-assembled, and the phase inversion pattern 104 is disposed on a surface of the polarizer 106 away from the color filter substrate 100. The phase inversion pattern 104 includes a plurality of openings 1041 corresponding to a plurality of color filter units 103 of the color filter layer 102, and the phase inversion pattern 104 defines a boundary of each of the color filter units 103. A projection of the phase inversion pattern 104 on the base substrate 101 at least partially covers a projection of an area between adjacent color filter units 103 on the base substrate.

For example, the polarizer 106 is attached to the surface of the color filter substrate 100 away from the array substrate 110 after the array substrate and the color filter substrate are cell-assembled, and the phase inversion pattern 104 is formed on a surface of the polarizer 106 away from the color filter substrate 100.

For example, in the method of manufacturing the display panel of the third embodiment provided in the present embodiment, the step of forming the phase inversion pattern 104 on the surface of the polarizer 106 away from the color film substrate 100 includes the steps as follows. A phase inversion film is formed on a surface of the polarizer 106 away from the color filter substrate 100, a photoresist film is formed on the phase inversion film, then a patterned photoresist is formed (e.g., in a laser-drawn manner), and the phase inversion film is etched to form a phase inversion pattern 104. The ways to form the phase inversion pattern 104 is not limited to the above-described method.

For example, in the method of manufacturing the display panel provided of the third embodiment provided in the present embodiment, the method of manufacturing the display panel further includes the step of bending the display panel into a curved display panel, thereby obtaining a curved surface display panel.

Sixth Embodiment

The present embodiment provides a display device including any one of the above-mentioned display panel.

It is to be noted that the entire structure of the color filter substrate, the display panel, and the display device is not illustrated. In order to realize the necessary functions of the display device, those skilled in the art can provide other structures not illustrated adapt to the specific application scenario, and the embodiments of the present disclosure are not limited thereto. The technical effects of the display device provided by the present embodiment can refer to the technical effects of the display panel described in the second to third embodiments described above, and will not be described again.

For example, in the color filter substrate, the display panel, or the display device provided by the embodiments of the present disclosure, a material of the phase inversion pattern 104 can include chromium oxide (CrOx), chromium nitrogen oxide (CrOxNy), Molybdenum silicon oxide (MoSiOx), tantalum silicon oxide (TaSiOx), titanium nitrogen oxide (TiOxNy), but the embodiments of the present disclosure are not limited thereto.

For example, the light transmittance of the phase inversion pattern 104 can be 4% to 15%, but the embodiment of the present disclosure is not limited thereto.

At least one embodiment of the present disclosure provides a color filter substrate, a display panel and a display device, which have at least one beneficial effect as follows.

(1) The shielding range of the conventional black matrix pattern is less than the width of the black matrix pattern due to the diffraction of light. On the contrary, the color filter substrate provided by at least one embodiment of the present disclosure with a phase inversion pattern formed thereon can avoid decrease of shielding range of a black matrix pattern caused by the diffraction of light, thereby increasing the aperture ratio. When a curved display panel is formed, because the phase inversion pattern is provided, light leakage caused by bending can be decreased, and a black matrix with wider width is no need to be provided, thereby product cost and power consumption can be decreased. And it is possible to avoid the weakening of light shielding effect due to the decrease in thickness of the black matrix during bending.

(2) In the color filter substrate, display panel and display device, no black matrix pattern can be provided, the phase inversion pattern can work with a plurality of signal lines (first signal lines and second signal lines) provided on the array substrate so as to achieve a better light shielding effect. And a black matrix pattern can also be provided, and the black matrix pattern can be provided on the color filter substrate, and the phase inversion pattern can work with the black matrix pattern to achieve a better light shielding effect. That is, the phase inversion pattern can cooperate with a black matrix pattern or a plurality of signal lines (first signal lines and second signal lines) to achieve a better light shielding effect.

(3) In the case where the phase inversion pattern is provided on a polarizer, since the polarizer has good toughness and flexibility, the phase inversion pattern does not generate a large deviation with the bending of the polarizer, and the light leakage due to bending can be avoided, which can solve leakage problem by using usual black matrix.

(4) In the case where the phase inversion pattern is provided on a polarizer, because the phase inversion pattern is formed after the array substrate and the color substrate are cell-assembled, and the accuracy of patterning is higher than that of cell-assembling, thereby aperture ratio can be increased, and decrease of light transmittance can be greatly avoided.

Moreover, the following needs to be noted.

(1) The embodiments of the present disclosure illustrated in the drawings are RGB (red, green, blue) color filter substrates as commonly used, but not limited thereto, and color filter substrates of other colors such as RGBW (red, green, blue, white) can be used.

(2) The embodiments of the present disclosure illustrated in the drawings are color filter units/sub-pixel structures arranged in arrays as commonly used, but not limited thereto, and other arrangement such as triangular arrangement or mosaic arrangement can be used.

(3) Only the structures involved in the embodiments of the present disclosure are involved drawings of the present disclosure, other structures can refer to usual designs.

(4) In order to clearly illustrate, a layer or an area may be amplified in the drawings of the embodiments of the present disclosure. It is to be understood that, when a member such as a layer, a film, an area or a substrate is located or disposed on or below another member, the member can be located or disposed on or below the another member directly, or an intermediate member or intermediate member(s) can be disposed.

(5) The features in different embodiments or the features in the same embodiments can be combined for obtaining new embodiments.

What have been described above are only specific implementations of the present disclosure, the protection scope of the present disclosure is not limited thereto. Any modifications or substitutions easily occur to those skilled in the art within the technical scope of the present disclosure should be within the protection scope of the present disclosure. Therefore, the protection scope of the present disclosure should be based on the protection scope of the claims.

This application claims the benefit of priority from Chinese patent application No. 201510695038.X, filed on Oct. 22, 2015, the disclosure of which is incorporated herein in its entirety by reference as a part of the present application.

What is claimed is:

1. A color filter substrate comprising a base substrate, and a color filter layer and a phase inversion layer which are disposed on the base substrate, wherein the color filter layer comprises a plurality of color filter patterns, and each color filter pattern comprises a first portion and a second portion at a periphery of the first portion;

the first portions of the plurality of color filter patterns serve as a plurality of color filter units of the color filter layer;

the phase inversion layer comprises a phase inversion pattern corresponding to the second portions of the plurality of color filter patterns and a plurality of openings respectively corresponding to the plurality of color filter units of the color filter layer, and the phase inversion pattern defines a boundary of each of the color filter units;

the phase inversion pattern overlaps the second portions in an area between the adjacent color filter units along a direction perpendicular to the base substrate;

the phase inversion pattern is configured to allow light passing through the phase inversion pattern to undergo phase inversion, a phase inversion angle of the light passing through the phase inversion pattern is 180°;

the color filter substrate further comprises a black matrix pattern, the black matrix pattern is correspondingly disposed between the adjacent color filter units, and a width of the black matrix patters is less than a width of the area between adjacent color filter units at a corresponding position;

the phase inversion pattern is at a side of the base substrate away from the color filter layer;

the base substrate is a bendable substrate, and the base substrate is a curved substrate when the bendable substrate is bent and a surface, which is provided with the phase inversion pattern, of the curved substrate is a concave surface; and the phase inversion pattern is hollowed at a position which overlaps a position where the black matrix pattern is provided.

2. The color filter substrate according to claim 1, wherein a material of the phase inversion pattern comprises any one selected from the group consisted of CrOx, CrOxNy, MoSiOx, TaSiOx, and TiOxNy.

3. A display panel comprising an array substrate and the color filter substrate according to claim 1.

4. The display panel according to claim 3, wherein the array substrate and the color filter substrate are cell-assembled to each other to form a liquid crystal cell, and a polarizer is provided on a surface of the color filter substrate away from the array substrate after the array substrate and the color filter substrate are cell-assembled, and the phase inversion pattern is provided on a surface of the polarizer away from the color filter substrate.

5. The display panel according to claim 4, wherein the display panel comprises a flat display panel or a curved display panel.

6. The display panel according to claim 3, wherein the array substrate comprises a plurality of first signal lines and a plurality of second signal lines, and the plurality of first signal lines intersects the plurality of second signal lines to define a plurality of sub-pixel units corresponding to the color filter units of the color filter substrate, and the phase inversion pattern is provided on a position corresponding to the plurality of first signal lines and the plurality of second signal lines.

7. The display panel according to claim 6, wherein a material of the plurality of first signal lines and the plurality of second signal lines comprises an opaque conductive material, and a width of each of the first signal lines and the second signal lines is less than or equal to a width of the area between adjacent color filter units at a corresponding position.

8. The display panel according to claim 3, wherein the display panel comprises a flat display panel or a curved display panel.

9. A display device comprising the display panel according to claim 3.

10. The display panel according to claim 3, wherein a material of the phase inversion pattern comprises any one selected from the group consisted of CrOx, CrOxNy, MoSiOx, TaSiOx, and TiOxNy.

11. The color filter substrate according to claim 1, wherein the phase inversion pattern further overlaps an area between adjacent color filter patterns along the direction perpendicular to the base substrate.

12. A manufacturing method of a display panel comprising forming an array substrate and a color filter substrate, wherein forming the color filter substrate comprises forming a color filter layer and a phase inversion layer on the base substrate,
wherein the color filter layer comprises a plurality of color filter patterns, and each color filter pattern comprises a first portion and a second portion at a periphery of the first portion;
the first portions of the plurality of color filter patterns serve as a plurality of color filter units of the color filter layer;
the phase inversion layer comprises a phase inversion pattern corresponding to the second portions of the plurality of color filter patterns and a plurality of openings respectively corresponding to the plurality of color filter units of the color filter layer, and the phase inversion pattern defines a boundary of each of the color filter units;
the phase inversion pattern on the base substrate at least partially overlaps the second portions in an area between the adjacent color filter units along a direction perpendicular to the base substrate;
the phase inversion pattern is configured to allow light passing through the phase inversion pattern to undergo phase inversion;
a phase inversion angle of the light passing through the phase inversion pattern is 180°;
the color filter substrate further comprises a black matrix pattern, wherein the black matrix pattern is correspondingly disposed between the adjacent color filter units, and a width of the black matrix pattern is less than a width of the area between adjacent color filter units at a corresponding position;
the phase inversion pattern is at a side of the base substrate away from the color filter layer;
the base substrate is a bendable substrate, and the base substrate is a curved substrate when the bendable substrate is bended and a surface, which is provided with the phase inversion pattern, of the curved substrate is a concave surface; and
the phase inversion pattern is hollowed at a position which overlaps a position where the black matrix pattern is provided.

13. The manufacturing method of the display panel according to claim 12, further comprising cell-assembling the array substrate and the color filter substrate to form a liquid crystal cell,
wherein a polarizer is provided on a surface of the color filter substrate away from the array substrate after the array substrate and the color filter substrate are cell-assembled, and the phase inversion pattern is formed on a surface of the polarizer away from the color filter substrate.

14. The manufacturing method of the display panel according to claim 12, further comprising bending the display panel to form a curved display panel.

15. The color filter substrate according to claim 12, wherein the phase inversion pattern further overlaps an area between adjacent color filter patterns along the direction perpendicular to the base substrate.

* * * * *